US011495821B2

(12) United States Patent
Naito et al.

(10) Patent No.: US 11,495,821 B2
(45) Date of Patent: Nov. 8, 2022

(54) FUEL CELL STACK AND METHOD OF ASSEMBLING FUEL CELL STACK

(71) Applicant: HONDA MOTOR CO., LTD., Tokyo (JP)

(72) Inventors: Hideharu Naito, Wako (JP); Masahiro Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 16/776,536

(22) Filed: Jan. 30, 2020

(65) Prior Publication Data

US 2020/0251764 A1 Aug. 6, 2020

(30) Foreign Application Priority Data

Feb. 4, 2019 (JP) ............................. JP2019-017857

(51) Int. Cl.
*H01M 8/2475* (2016.01)
*H01M 8/0247* (2016.01)
*H01M 8/0267* (2016.01)
*H01M 8/1004* (2016.01)
*H01M 8/2485* (2016.01)

(52) U.S. Cl.
CPC ....... *H01M 8/2475* (2013.01); *H01M 8/0247* (2013.01); *H01M 8/0267* (2013.01); *H01M 8/1004* (2013.01); *H01M 8/2485* (2013.01)

(58) Field of Classification Search
CPC . H01M 8/2475; H01M 8/0247; H01M 8/0267
See application file for complete search history.

(56) References Cited

U.S. PATENT DOCUMENTS

| 2009/0162728 | A1 | 6/2009 | Inagaki et al. |
| 2013/0230785 | A1* | 9/2013 | Terada ................. H01M 8/0267 |
| | | | 429/434 |
| 2014/0162166 | A1 | 6/2014 | Nishiyama et al. |

FOREIGN PATENT DOCUMENTS

| CN | 101467299 | 6/2009 |
| JP | 2014-132558 | 7/2014 |

OTHER PUBLICATIONS

Chinese Office Action and Search Report for Chinese Patent Application No. 202010078966.2 dated Sep. 21, 2022.

* cited by examiner

*Primary Examiner* — James Lee
(74) *Attorney, Agent, or Firm* — Amin, Turocy & Watson, LLP

(57) ABSTRACT

A fuel cell stack includes an insulating collar member provided in an end plate and screwed with a positioning pin, and a rotation restriction mechanism that restricts rotation of the collar member relative to the end plate in a screw tightening direction of the positioning pin. A method of assembling the fuel cell stack includes a screwing step and a stacking step. In the screwing step, rotation of the collar member relative to the end plate in the screw tightening direction of the positioning pin is restricted by the rotation restriction mechanism.

12 Claims, 13 Drawing Sheets

FUEL CELL STACK AND METHOD OF ASSEMBLING FUEL CELL STACK

CROSS-REFERENCE TO RELATED APPLICATION

This application is based upon and claims the benefit of priority from Japanese Patent Application No. 2019-017857 filed on Feb. 4, 2019, the contents of which are incorporated herein by reference.

BACKGROUND OF THE INVENTION

Field of the Invention

The present invention relates to a fuel cell stack and a method of assembling the fuel cell stack.

Description of the Related Art

For example, Japanese Laid-Open Patent Publication No. 2014-132558 discloses a fuel cell stack including a stack body formed by stacking a plurality of unit cells together, and metal end plates provided at both ends of the stack body in a stacking direction. Each of the unit cells includes a positioning hole for inserting a positioning pin (knock pin) into the positioning hole. The positioning pin is inserted into an insertion hole of a resin collar member provided in a hole formed in an end plate.

SUMMARY OF THE INVENTION

In this regard, in the case where the positioning pin is configured to be screwed with the collar member, at the time of screwing the positioning pin with the collar member, the collar member may rotate (co-rotate) relative to an end plate in a screw tightening direction of a positioning pin undesirably.

The present invention has been made taking such a problem into consideration, and an object of the present invention is to provide a fuel cell stack and a method of assembling the fuel cell stack which makes it possible to attach a positioning pin to a collar member efficiently.

According to one aspect of the present invention, provided is a fuel cell stack including a stack body comprising a plurality of unit cells stacked together, an end plate made of metal and provided at each of both ends of the stack body in a stacking direction, a positioning pin inserted into a positioning hole provided in each of the plurality of unit cells to position the plurality of unit cells, an insulating collar member provided in the end plate and screwed with the positioning pin, and a rotation restriction mechanism configured to restrict rotation of the collar member relative to the end plate in a screw tightening direction of the positioning pin.

According to another aspect of the present invention, provided is a method of assembling a fuel cell stack including a stack body comprising a plurality of unit cells stacked together, an end plate made of metal and provided at each of both ends of the stack body in a stacking direction, and a positioning pin inserted into a positioning hole provided in each of the plurality of unit cells to position the plurality of unit cells, the method including the steps of: screwing the positioning pin with an insulating collar member provided in the end plate; and stacking the plurality of unit cells together while inserting the positioning pin into the positioning hole, after the screwing step, wherein in the screwing step, rotation of the collar member relative to the end plate in a screw tightening direction of the positioning pin is restricted by a rotation restriction mechanism.

In the present invention, the rotation restriction mechanism restricts rotation of the collar member relative to the end plate in the screw tightening direction of the positioning pin. In the structure, at the time of screwing the positioning pin with the collar member, it is possible to suppress co-rotation of the collar member with the positioning pin. Accordingly, it is possible to efficiently attach the positioning pin to the collar member.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, a fuel cell stack and a method of assembling the fuel cell stack according to the present invention will be described in connection with preferred embodiments, with reference to the accompanying drawings.

Figure 1:
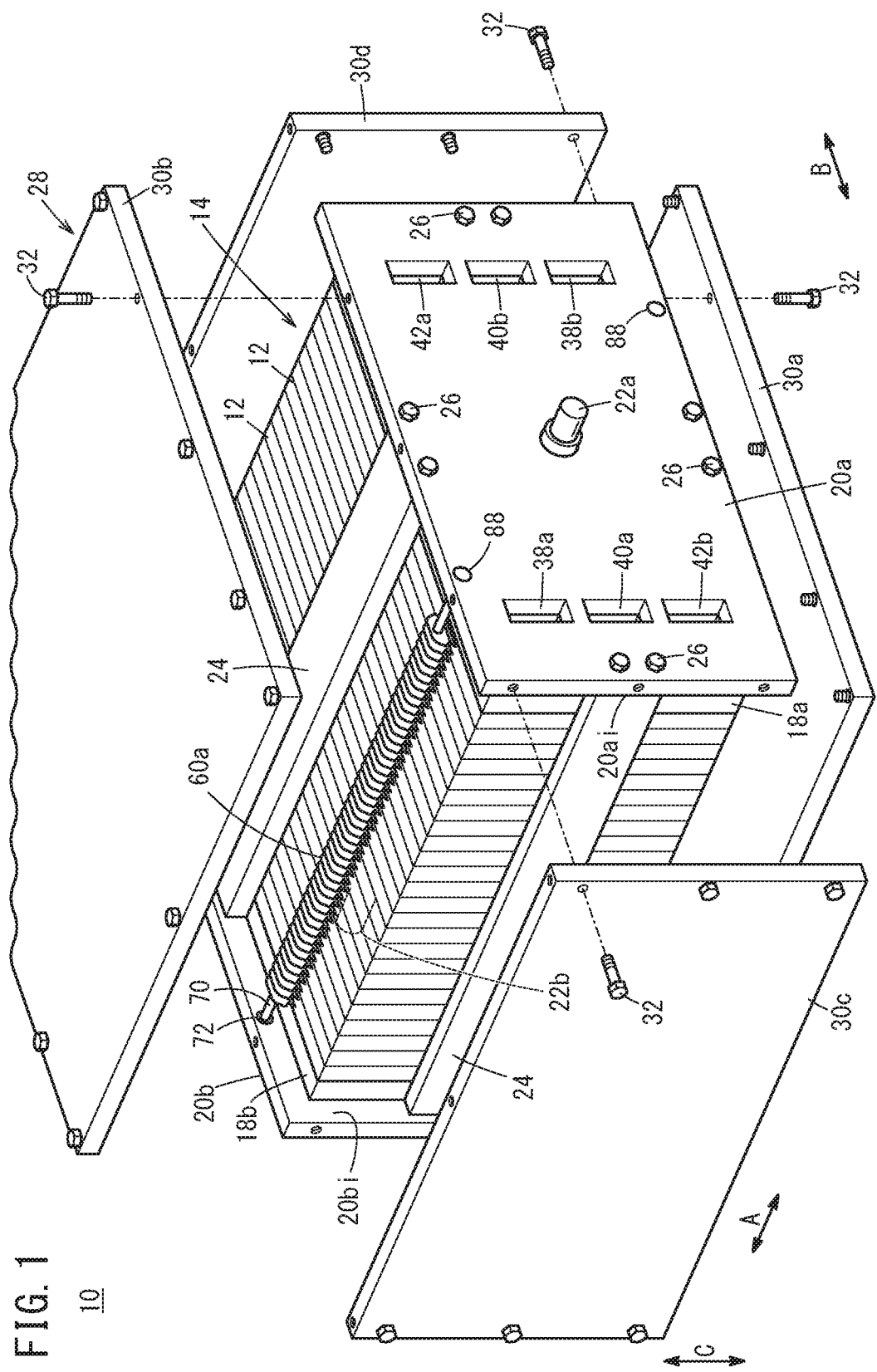
FIG. 1 is a partial exploded perspective view showing a fuel cell stack according to an embodiment of the present invention.

As shown in FIG. 1, a fuel cell stack 10 according to an embodiment of the present invention includes a stack body 14 formed by stacking a plurality of unit cells 12 (power generation cells) together. The fuel cell stack 10 is mounted in a fuel cell automobile (not shown). It should be noted that the fuel cell stack 10 may be used in stationary applications.

Figure 2:
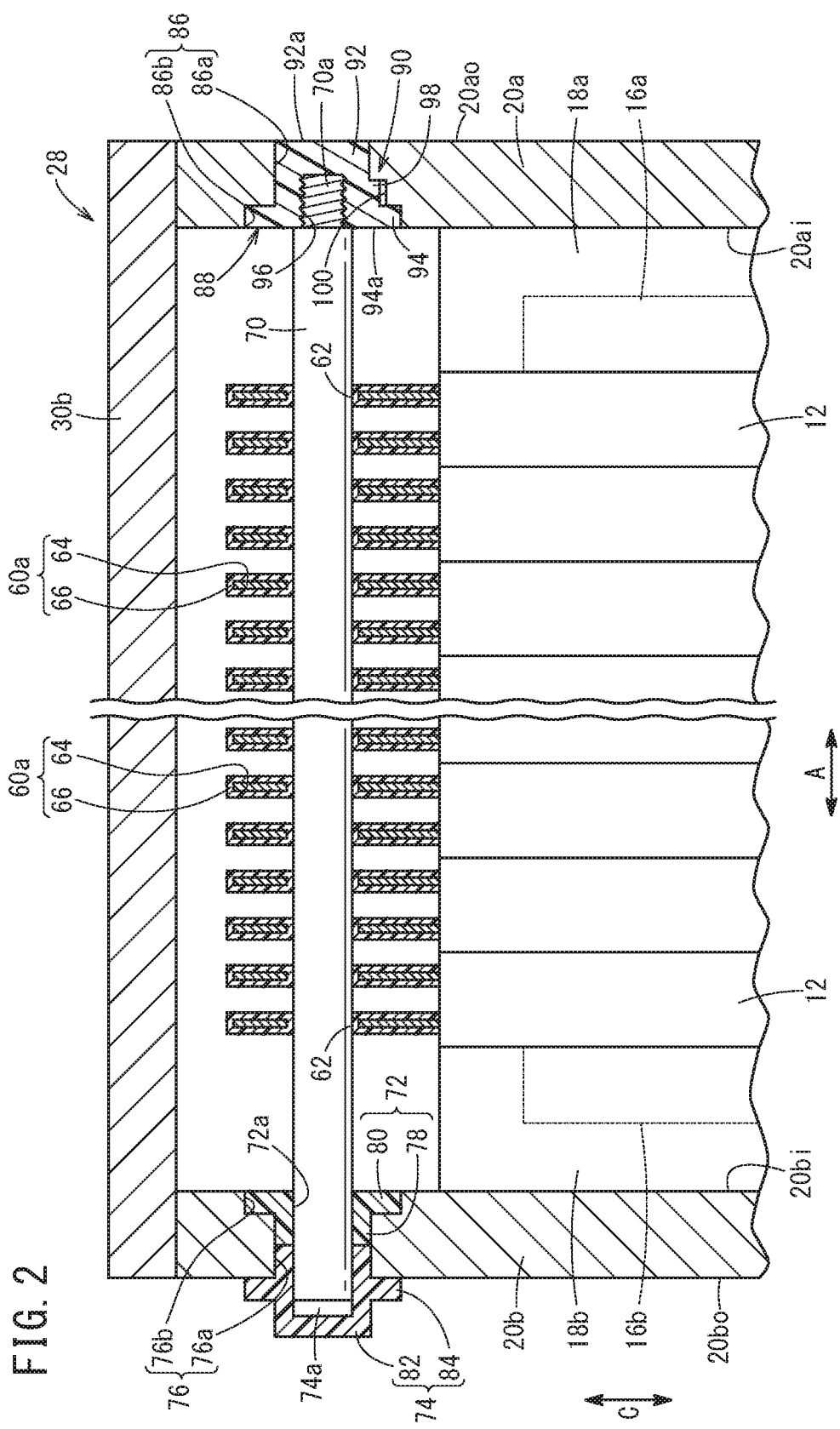
FIG. 2 is a vertical cross sectional view with partial omission showing the fuel cell stack in FIG. 1.

In FIGS. 1 and 2, at one end of the stack body 14 in the stacking direction indicated by an arrow A, a terminal plate 16a is provided. An insulator 18a is provided outside the terminal plate 16a, and an end plate 20a is provided outside the insulator 18a. At the other end of the stack body 14 in the stacking direction, a terminal plate 16b is provided. An insulator 18b is provided outside the terminal plate 16b. An end plate 20b is provided outside the insulator 18b.

That is, the pair of end plates 20a, 20b are provided at both ends of in a stacking direction in which the plurality of unit cells 12 are stacked together to form the stack body 14. An output terminal 22a is provided at a substantially central position of the end plate 20a. An output terminal 22a is connected to the terminal plate 16a, and extends outward in the stacking direction. An output terminal 22b is provided at a substantially central position of the end plate 20b. An output terminal 22b is connected to the terminal plate 16b, and extends outward in the stacking direction.

As shown in FIG. 1, each of the end plates 20a, 20b is made of metal, and has a laterally elongated rectangular shape. Coupling members 24 (coupling bars) are provided between the sides of the end plates 20a, 20b. Both ends of each of the coupling members 24 are fixed to inner surfaces 20ai, 20bi of the end plates 20a, 20b using bolts 26. Thus, the coupling members 24 apply a tightening load in the stacking direction indicated by the arrow A, to the stack body 14.

The fuel cell stack 10 includes a cover 28 which covers the stack body 14 in a direction perpendicular to the stacking direction. The cover 28 includes a pair of side panels 30a, 30b having a laterally elongated shape and provided on the long sides of the end plates 20a, 20b, and a pair of side panels 30c, 30d having a laterally elongated shape and provided on the short sides of the end plates 20a, 20b. Each of the side panels 30a to 30d is fixed to the side surfaces of the end plates 20a, 20b using bolts 32. The cover 28 may be a one-piece component formed by casting, or made of extruded material. The cover 28 may be provided as necessary, and may be dispensed with.

Figure 3:
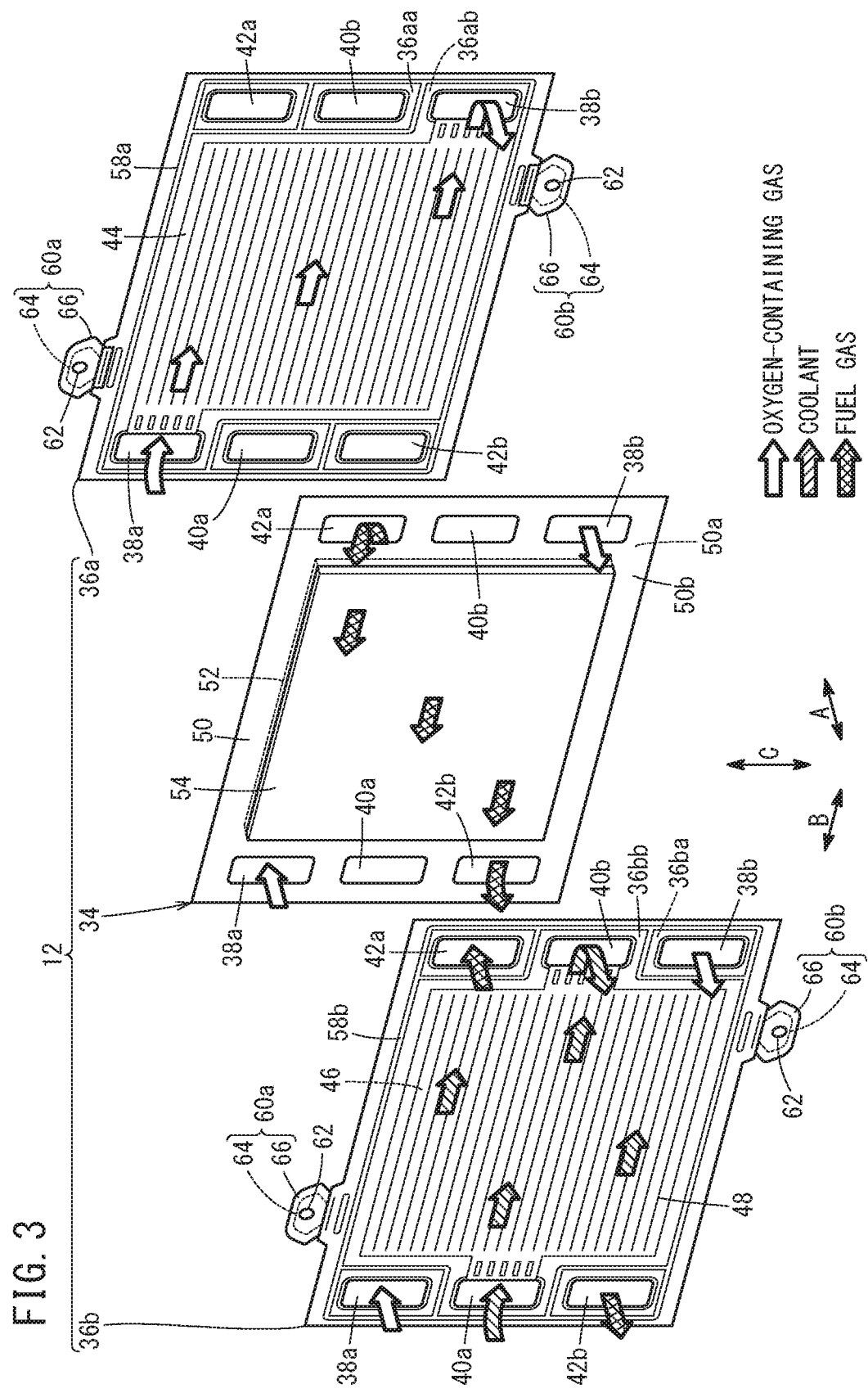
FIG. 3 is an exploded perspective view showing a unit cell in FIG. 1.

As shown in FIG. 3, the unit cell 12 includes an MEA 34 (membrane electrode assembly), and a first separator 36a and a second separator 36b sandwiching the MEA 34.

At one end of the unit cell 12 in a long side direction indicated by an arrow B, an oxygen-containing gas supply passage 38a, a coolant supply passage 40a, and a fuel gas discharge passage 42b are arranged in a direction indicated by an arrow C. An oxygen-containing gas is supplied through the oxygen-containing gas supply passage 38a. A coolant such as pure water, ethylene glycol, oil is supplied to the coolant supply passage 40a. A fuel gas such as a hydrogen-containing gas is discharged through the fuel gas discharge passage 42b.

The oxygen-containing gas supply passage 38a extends through each of the unit cells 12 in the stacking direction (indicated by the arrow A). The coolant supply passage 40a extends through each of the unit cells 12 in the stacking direction. The fuel gas discharge passage 42b extends through each of the unit cells 12 in the stacking direction.

At the other end of the unit cells 12 in the direction indicated by the arrow B, a fuel gas supply passage 42a, a coolant discharge passage 40b, and an oxygen-containing gas discharge passage 38b are arranged in the direction indicated by the arrow C. The fuel gas is supplied through the fuel gas supply passage 42a. The coolant is discharged through the coolant discharge passage 40b. The oxygen-containing gas is discharged through the oxygen-containing gas discharge passage 38b.

The fuel gas supply passage 42a extends through each of the unit cells 12 in the stacking direction. The coolant discharge passage 40b extends through each of the unit cells 12 in the stacking direction. The oxygen-containing gas discharge passage 38b extends through each of the unit cells 12 in the stacking direction.

It should be noted that the oxygen-containing gas supply passage 38a, the oxygen-containing gas discharge passage 38b, the fuel gas supply passage 42a, the fuel gas discharge passage 42b, the coolant supply passage 40a, and the coolant discharge passage 40b are formed in the insulator 18a and the end plate 20a as well (see FIG. 1).

The layout of the oxygen-containing gas supply passage 38a, the oxygen-containing gas discharge passage 38b, the fuel gas supply passage 42a, the fuel gas discharge passage 42b, the coolant supply passage 40a, and the coolant discharge passage 40b are not limited to the illustrated embodiment, and may be changed as necessary depending on the required specification.

The first separator 36a has an oxygen-containing gas flow field 44 on its surface 36aa facing the MEA 34. The oxygen-containing gas flow field 44 is connected to the oxygen-containing gas supply passage 38a and the oxygen-containing gas discharge passage 38b. The oxygen-containing gas flow field 44 includes a plurality of oxygen-containing gas flow grooves extending in the direction by the arrow B.

The second separator 36b has a fuel gas flow field 46 on its surface 36ba facing the MEA 34. The fuel gas flow field 46 is connected to the fuel gas supply passage 42a and the fuel gas discharge passage 42b. The fuel gas flow field 46 includes a plurality of fuel gas flow grooves extending in the direction indicated by the arrow A.

A coolant flow field 48 is formed between a surface 36ab of the first separator 36a and a surface 36bb of the second separator 36b that face each other. The coolant flow field 48 includes a plurality of coolant flow grooves extending in the direction indicated by the arrow B.

For example, the MEA 34 includes an electrolyte membrane 50 (solid polymer electrolyte membrane) which is a thin membrane of perfluorosulfonic acid containing water, and a cathode 52 and an anode 54 provided on both sides of the electrolyte membrane 50.

A fluorine based electrolyte may be used as the electrolyte membrane 50. Alternatively, an HC (hydrocarbon) based electrolyte may be used as the electrolyte membrane 50. The surface size (outer size) of the electrolyte membrane 50 is larger than the surface sizes of the cathode 52 and the anode

54. That is, the electrolyte membrane 50 protrudes outward beyond the cathode 52 and the anode 54.

The cathode 52 is joined to one surface 50a of the electrolyte membrane 50. The anode 54 is joined to the other surface 50b of the electrolyte membrane 50. Each of the cathode 52 and the anode 54 includes an electrode catalyst layer and a gas diffusion layer. The electrode catalyst layer is formed by paste containing porous carbon particles and ion conductive component deposited uniformly on the surface of the gas diffusion layer, and platinum alloy supported on the surfaces of the porous carbon particles. The gas diffusion layer comprises a carbon paper, a carbon cloth, etc.

It should be noted that, in the MEA 34, the surface size of the electrolyte membrane 50 may be smaller than the surface size of the cathode 52 and the anode 54, and a resin film (resin frame member) having a frame shape may be sandwiched between the outer marginal portion of the cathode 52 and the outer marginal portion of the anode 54.

Each of the first separator 36a and the second separator 36b has a rectangular (quadrangular) shape such that reactant gases flow along long sides of the first separator 36a and the second separator 36b. Each of the first separator 36a and the second separator 36b is formed by press forming of, e.g., a steel plate, a stainless steel plate, an aluminum plate, a plated steel plate, or a metal thin plate having an anti-corrosive surface by surface treatment, to have a corrugated shape in cross section. In a state where the surface 36ab and the surface 36bb face each other, outer ends of the first separator 36a and the second separator 36b are joined together by welding, brazing, crimping, etc.

A first seal line 58a is formed on the first separator 36a. The first seal line 58a is expanded toward the MEA 34. The first seal line 58a is provided along the outer peripheral portion of the first separator 36a, to prevent leakage of fluids (the fuel gas, the oxygen-containing gas, and the coolant) from the position between the first separator 36a and the MEA 34. That is, the protruding end surface of the first seal line 58a directly contacts the electrolyte membrane 50, and is deformed elastically to provide a sealing function as a metal bead seal. It should be noted that the first seal line 58a may be an elastic rubber seal member.

A second seal line 58b is formed on the second separator 36b. The second seal line 58b is expanded toward the MEA 34. The second seal line 58b is provided along the outer peripheral portion of the second separator 36b, to prevent leakage of fluids (the fuel gas, the oxygen-containing gas, and the coolant) from the position between the second separator 36b and the MEA 34. That is, the protruding end surface of the second seal line 58b directly contacts the surface 50b of the electrolyte membrane 50, and is deformed elastically to provide a sealing function as a metal bead seal. It should be noted that the second seal line 58b may be an elastic rubber seal member.

Two protrusions 60a, 60b are provided to the first separator 36a. The protrusions 60a, 60b protrude outward from the outer peripheral portion of the first separator 36a. The protrusion 60a is positioned at one end of the first separator 36a in the direction indicated by the arrow B (adjacent to the oxygen-containing gas supply passage 38a), in the outer marginal portion on one side in the direction indicated by the arrow C. The protrusion 60b is positioned on at the other end of the first separator 36a in the direction indicated by the arrow B (adjacent to the oxygen-containing gas discharge passage 38b), in the outer marginal portion on the other side in the direction indicated by the arrow C.

A positioning hole 62, into which a positioning pin 70 described later (see FIGS. 1 and 2) is inserted, is formed at substantially the center of the protrusion 60a. In FIG. 3, the positioning pin 70 is not illustrated.

As shown in FIGS. 2 and 3, the protrusion 60a includes a support part 64 in the form of a plate, and an insulating part 66 which covers the support part 64. For example, the support part 64 is made of metal, e.g., made of the same material as the first separator 36a. The support part 64 is welded to the first separator 36a. It should be noted that the support part 64 may be formed integrally with the first separator 36a. The positioning hole 62 is formed in the insulating part 66 covering the support part 64.

The insulating part 66 is made of electrically insulating material such as resin. The insulating part 66 covers a portion of the support part 64 protruding from the first separator 36a. The wall forming the positioning hole 62 is formed by the insulating part 66 (made of insulating material).

The protrusion 60b has the same structure as the protrusion 60a. Therefore, the detailed structure of the protrusion 60b is omitted. The second separator 36b has the two protrusions 60a, 60b as with the first separator 36a. That is, each of the unit cells 12 includes two protrusions 60a and two protrusions 60b.

As shown in FIG. 2, the fuel cell stack 10 includes two positioning pins 70 (knock pins) for positioning the plurality of unit cells 12 together. The positioning pins 70 are inserted into the positioning holes 62 of the protrusions 60a, 60b of the unit cells 12. In the example of FIG. 2, the positioning pin 70 is positioned outside the insulators 18a, 18b (the positioning pin 70 does not penetrate through the insulators 18a, 18b). Alternatively, the positioning pin 70 may penetrate through the insulators 18a, 18b.

For example, the positioning pin 70 is made of metal material such as iron, stainless steel, aluminum, titanium, magnesium, and has a cylindrical column shape, or a cylindrical shape. One end of the positioning pin 70 is provided with a male screw part 70a screwed with a collar member 88 described later, which is provided in the end plate 20a. The other end of the positioning pin 70 is supported by a first support member 72 and a second support member 74 provided to the end plate 20b.

The first support member 72 and the second support member 74 are inserted into a through hole 76 formed in the end plate 20b. The through hole 76 is a stepped hole, including a small diameter hole 76a and a large diameter hole 76b. The small diameter hole 76a is opened to an outer surface 20bo of the end plate 20b. The large diameter hole 76b is connected to the small diameter hole 76a, and opened to the inner surface 20bi of the end plate 20b.

The first support member 72 has a cylindrical shape. That is, the first support member 72 has an inner hole 72a, into which the other end of the positioning pin 70 is inserted. The first support member 72 includes a cylindrical first support body 78 inserted into one end of the small diameter hole 76a, and a first annular part 80 provided to the first support body 78 and inserted into the large diameter hole 76b. The first annular part 80 extends outward in the radial direction from the end of the first support body 78 in the axial direction (end closer to the stack body 14).

The second support member 74 has a cylindrical shape with a bottom. That is, the second support member 74 has a recess 74a into which the other end of the positioning pin 70 is inserted. The second support member 74 includes a cylindrical second support body 82 inserted into the other end of the small diameter hole 76a, and a second annular part 84 provided to the second support body 82. One end surface of the second support body 82 is provided adjacent to the end surface of the first support body 78. The other end (bottom side) of the second support body 82 is positioned outside the end plate 20*b* to cover the other end of the positioning pin 70. The second annular part 84 extends outward in the radial direction from the substantially central part of the second support body 82 in the axial direction. The second annular part 84 contacts the outer surface 20*bo* of the end plate 20*b*.

Figure 4A:
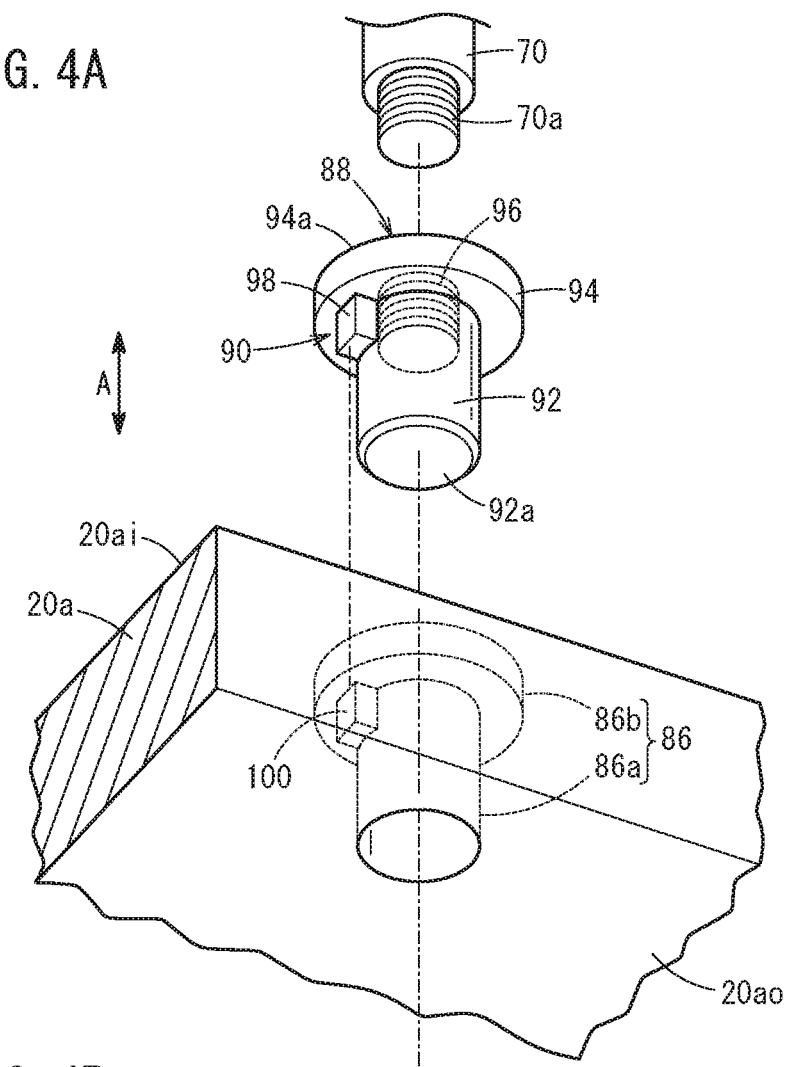
FIG. 4A is an exploded perspective view with partial omission showing a rotation restriction mechanism.
Figure 4B:
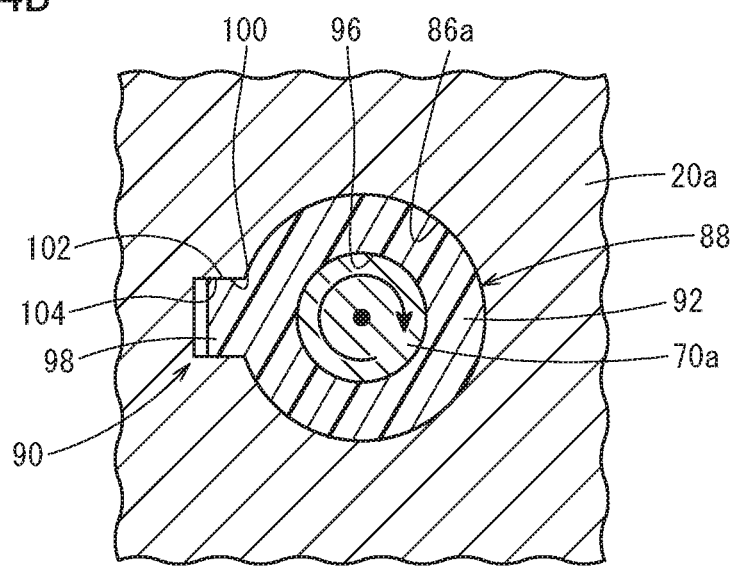
FIG. 4B is a lateral cross sectional view showing the rotation restriction mechanism in FIG. 4A.

As shown in FIGS. 2, 4A, and 4B, the fuel cell stack 10 includes the collar member 88 inserted into a through hole 86 formed in the end plate 20*a*, and a rotation restriction mechanism 90.

The through hole 86 is a stepped hole, including a small diameter insertion hole 86*a* and a large diameter flange hole 86*b*. The insertion hole 86*a* is opened to an outer surface 20*ao* of the end plate 20*a*. The flange hole 86*b* is connected to the insertion hole 86*a*, and opened to the inner surface 20*ai* of the end plate 20*a*. The collar member 88 is made of insulating material (electrically insulating material). The collar member 88 includes a circular column shaped collar body 92, and a flange part 94 provided to the collar body 92.

The collar body 92 is inserted into the insertion hole 86*a*. An end surface 92*a* of the collar body 92 is flush with the outer surface 20*ao* of the end plate 20*a* (see FIG. 2). It should be noted that the end surface 92*a* of the collar body 92 may be positioned inside the outer surface 20*ao* of the end plate 20*a* in the stacking direction of the stack body 14, or may be positioned outside the outer surface 20*ao* of the end plate 20*a* in the stacking direction of the stack body 14. The outer diameter of the collar body 92 and the inner diameter (hole diameter) of the insertion hole 86*a* are substantially the same. The collar body 92 may have a cylindrical shape.

The flange part 94 is inserted into the flange hole 86*b*. The flange part 94 protrudes outward in the radial direction from the end of the collar body 92 in the axial direction (end closer to the stack body 14), and extends in the annular shape. A female screw part 96 (screw hole) screwed with the male screw part 70*a* of the positioning pin 70 is formed at a substantially central position of an outer surface 94*a* of the flange part 94.

The rotation restriction mechanism 90 restricts rotation of the collar member 88 relative to the end plate 20*a* in the screw tightening direction of the positioning pin 70 (indicated by an arrow in FIG. 4B). The rotation restriction mechanism 90 includes a projection 98 protruding outward in the radial direction from the outer circumferential surface of the collar body 92, and a groove 100 formed in a wall surface forming the insertion hole 86*a*.

The protruding length of the projection 98 from the collar body 92 is shorter than the protruding length of the flange part 94 from the collar body 92. The protruding length of the projection 98 may be determined arbitrarily. The projection 98 has a rectangular parallelepiped shape, and extends from the flange part 94 toward the end surface 92*a* of the collar body 92.

That is, in FIG. 4B, the lateral cross sectional surface of the projection 98 has a quadrangular shape. The projection 98 is positioned outside of the female screw part 96 in the radial direction (see FIG. 2). The portion of the projection 98 that is positioned in the screw tightening direction of the positioning pin 70 includes a first contact surface 102. The first contact surface 102 has a flat shape.

As shown in FIGS. 2, 4A, and 4B, the groove 100 extends in the axial direction of the collar body 92, and the projection 98 is inserted into the groove 100. The groove 100 has a shape (rectangular parallelepiped shape) corresponding to the shape of the projection 98. In FIG. 4B, the wall forming the groove 100 includes a second contact surface 104 which contacts the first contact surface 102. The second contact surface 104 has a flat shape, and extends in parallel with the first contact surface 102.

The shapes of the projection 98 and the groove 100 may be determined arbitrarily. The lateral cross section of the projection 98 may be a triangular shape or any other polygonal shape (other than the quadrangular shape). Further, as long as the projection 98 can be inserted into the groove 100 (as long as rotation of the collar body 92 can be restricted), the groove 100 may not have the shape corresponding to the projection 98. Further, as long as the projection 98 can be inserted into the groove 100, the phases of the projection 98 and the groove 100 in the circumferential direction of the collar body 92 are not limited specially.

Next, a method of assembling the fuel cell stack 10 having the above structure will be described below.

Figure 5:
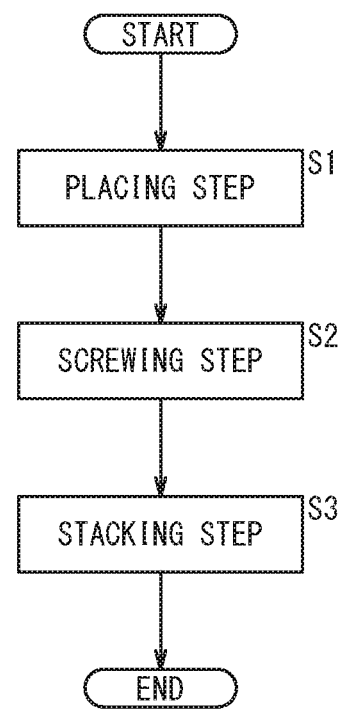
FIG. 5 is a flow chart showing a method of assembling a fuel cell stack according to an embodiment of the present invention.

In the method of assembling the fuel cell stack 10, a placing step, a screwing step, and a stacking step shown in FIG. 5 are performed in this order.

Figure 6:
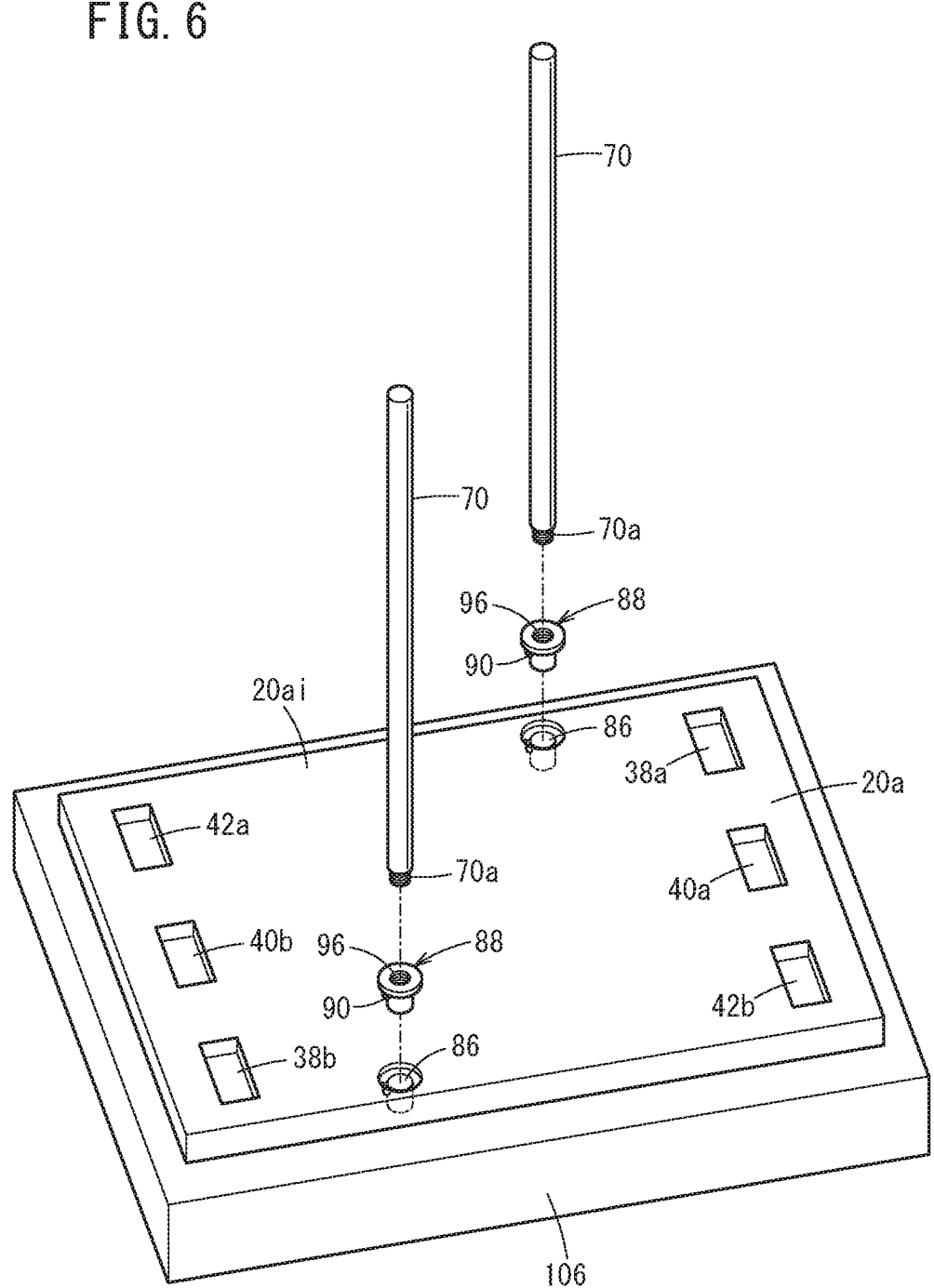
FIG. 6 is a view showing a placing step and a screwing step.

In the placing step, as shown in FIG. 6, the end plate 20*a* is placed on a base frame 106, and the collar members 88 are inserted into the through holes 86. At this time, the inner surface 20*ai* of the end plate 20*a* is oriented upward (in a direction opposite to the base frame 106).

In the screwing step, the male screw part 70*a* of the positioning pin 70 is screwed with the female screw part 96 of the collar member 88. At this time, a screw tightening force indicated by an arrow in FIG. 4B is applied to the collar member 88. However, rotation of the collar member 88 in the screw tightening direction of the positioning pin 70 is restricted by the rotation restriction mechanism 90. Since the first contact surface 102 of the projection 98 contacts the second contact surface 104 of the groove 100, the collar member 88 does not rotate in the screw tightening direction of the positioning pin 70. Therefore, the operator (user) can attach the positioning pin 70 to the collar member 88 efficiently.

Figure 7:
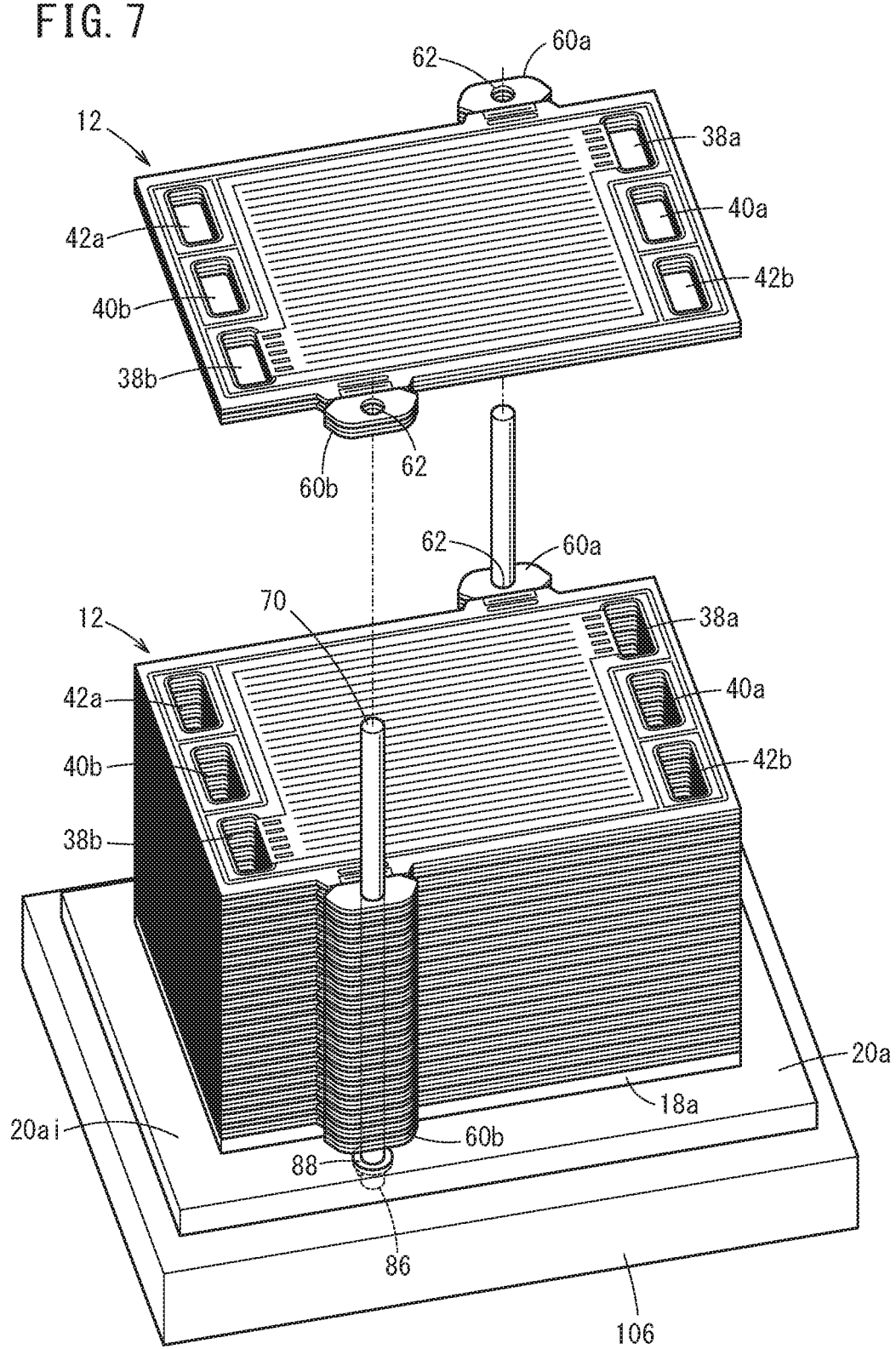
FIG. 7 is a view showing a stacking step.

In the stacking step, as shown in FIG. 7, the plurality of unit cells 12 are stacked together on the insulator 18*a* and the terminal plate 16*a* stacked on the inner surface 20*ai* of the end plate 20*a*. Specifically, the unit cells 12 are moved toward the end plate 20*a* while inserting the positioning pins 70 into the positioning holes 62 of the unit cells 12.

When the stacking step is finished, the terminal plate 16*b*, the insulator 18*b*, and the end plate 20*b* are stacked at the other end of the stack body 14, and the other end of each of the positioning pins 70 is inserted into the inner hole 72*a* of the first support member 72 and the recess 74*a* of the second support member 74 (see FIG. 2). Thereafter, a tightening load is applied to the stack body 14 by the coupling members 24, and assembling of the fuel cell stack 10 is finished.

Next, operation of the fuel cell stack 10 will be described.

Firstly, as shown in FIG. 1, an oxygen-containing gas is supplied to the oxygen-containing gas supply passage 38*a* of the end plate 20*a*. A fuel gas is supplied to the fuel gas supply passage 42*a* of the end plate 20*a*. A coolant is supplied to the coolant supply passage 40*a* of the end plate 20*a*.

As shown in FIG. 3, the oxygen-containing gas flows from the oxygen-containing gas supply passage 38*a* into the oxygen-containing gas flow field 44 of the first separator 36*a*. The oxygen-containing gas moves along the oxygen-containing gas flow field 44 in the direction indicated by the arrow B, and the oxygen-containing gas is supplied to the cathode 52 of the membrane electrode assembly.

In the meanwhile, the fuel gas flows from the fuel gas supply passage 42a into the fuel gas flow field 46 of the second separator 36b. The fuel gas moves along the fuel gas flow field 46 in the direction indicated by the arrow B, and the fuel gas is supplied to the anode 54 of the membrane electrode assembly.

Therefore, in each of the MEAs 34, the oxygen-containing gas supplied to the cathode 52 and the fuel gas supplied to the anode 54 are consumed in electrochemical reactions to generate electricity.

Then, the oxygen-containing gas supplied to the cathode 52 is partially consumed at the cathode 52, and the oxygen-containing gas is discharged along the oxygen-containing gas discharge passage 38b in the direction indicated by the arrow A. Likewise, the fuel gas supplied to the anode 54 is partially consumed at the anode 54, and the fuel gas is discharged along the fuel gas discharge passage 42b in the direction indicated by the arrow A.

Further, after the coolant supplied to the coolant supply passage 40a flows into the coolant flow field 48 formed between the first separator 36a and the second separator 36b, the coolant flows in the direction indicated by the arrow B. After this coolant cools the MEA 34, the coolant is discharged from the coolant discharge passage 40b.

In this case, the fuel cell stack 10 and the method of assembling the fuel cell stack 10 according to the embodiment of the present invention offer the following advantages.

The fuel cell stack 10 includes the insulating collar member 88 provided in the end plate 20a and screwed with the positioning pin 70, and the rotation restriction mechanism 90 for restricting rotation of the collar member 88 relative to the end plate 20a in the screw tightening direction of the positioning pin 70.

Further, the method of assembling the fuel cell stack 10 includes the steps of: screwing the positioning pin 70 with the insulating collar member 88 provided in the end plate 20a; and stacking the plurality of unit cells 12 together while inserting the positioning pin 70 into the positioning hole 62, after the screwing step. In the screwing step, rotation of the collar member 88 relative to the end plate 20a in the screw tightening direction of the positioning pin 70 is restricted by the rotation restriction mechanism 90.

As described above, the rotation restriction mechanism 90 restricts rotation of the collar member 88 relative to the end plate 20a in the screw tightening direction of the positioning pin 70. Therefore, at the time of screwing the positioning pin 70 with the collar member 88, it is possible to suppress co-rotation of the collar member 88 with the positioning pin 70. Accordingly, it is possible to efficiently attach the positioning pin 70 to the collar member 88.

The collar member 88 includes the collar body 92 having a circular column shape or a cylindrical shape and inserted into an insertion hole 86a formed in the end plate 20a. The rotation restriction mechanism 90 includes the projection 98 protruding outward in the radial direction from an outer circumferential surface of the collar body 92, and the groove 100 extending in the axial direction of the collar body 92, and formed in the wall surface forming the insertion hole 86a, the projection 98 being inserted into the groove 100.

In the structure, it is possible to bring the projection 98 (first contact surface 102 of the projection 98) into contact with the wall surface (second contact surface 104) forming the groove 100. Therefore, with the simple structure, it is possible to restrict rotation of the collar member 88 relative to the end plate 20a in the screw tightening direction of the positioning pin 70.

Each of the plurality of unit cells 12 includes the membrane electrode assembly (MEA 34) including the electrolyte membrane 50 and the electrodes (the cathode 52 and the anode 54) provided on both sides of the electrolyte membrane 50, the separators (the first separator 36a and the second separator 36b) provided on both sides of the membrane electrode assembly (MEA 34), and the protrusions 60a, 60b protruding from the outer peripheral portion of each of the separators (the first separator 36a and the second separator 36b), and each having the positioning hole 62.

The wall forming the positioning hole 62 is made of electrically insulating material.

In the structure, it is possible to prevent electrical conduction between the separators (the first separator 36a and the second separator 36b) and the positioning pin 70.

Next, rotation restriction mechanisms 90a to 90e according to first to fifth modified embodiments will be described.

First Modified Embodiment

Figure 8A:
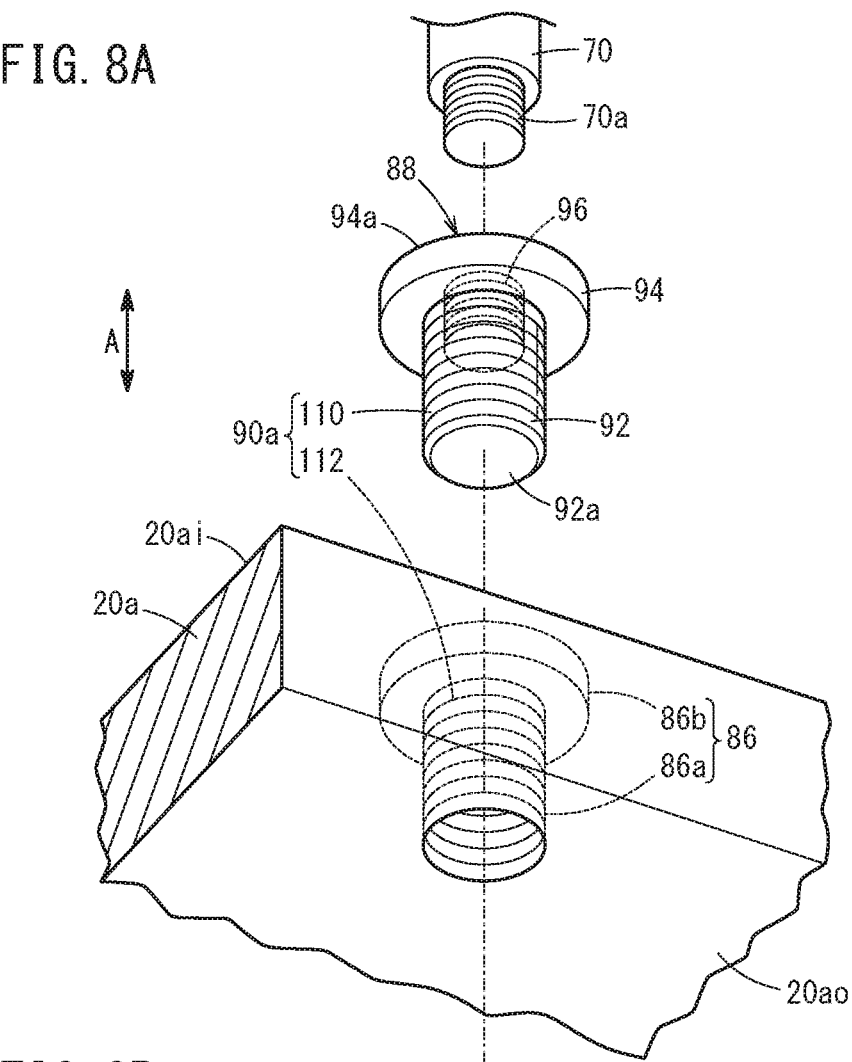
FIG. 8A is an exploded perspective view with partial omission showing a rotation restriction mechanism according to a first modified embodiment.
Figure 8B:
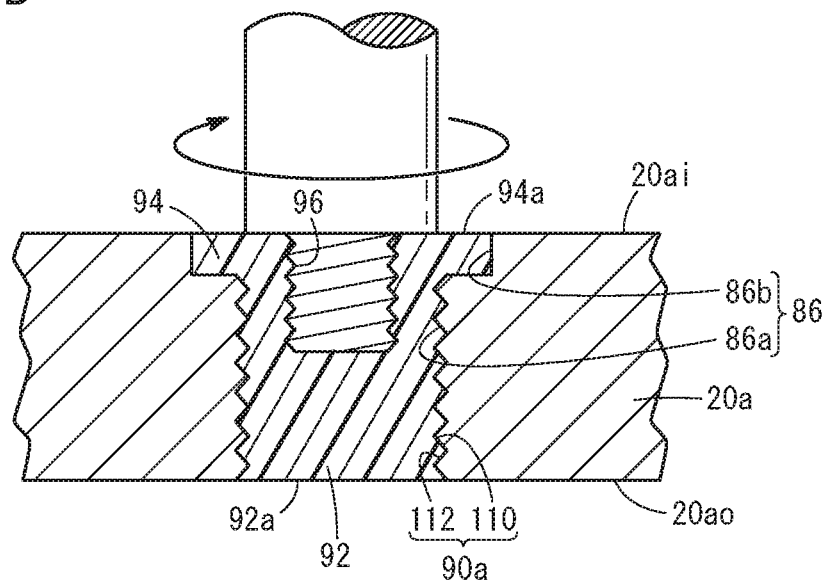
FIG. 8B is a vertical cross sectional view with partial omission showing the rotation restriction mechanism in FIG. 8A.

As shown in FIGS. 8A and 8B, a rotation restriction mechanism 90a according to the first modified embodiment includes a male screw part 110 formed on an outer circumferential surface of a collar body 92, and a female screw part 112 formed in a wall surface forming an insertion hole 86a, and screwed with the male screw part 110. The screw tightening direction of the collar body 92 relative to the end plate 20a is the same as the screw tightening direction of the positioning pin 70 relative to the collar member 88.

In this case, with the simple structure, it is possible to restrict rotation of the collar member 88 relative to the end plate 20a in the screw tightening direction of the positioning pin 70.

Second Modified Embodiment

Figure 9A:
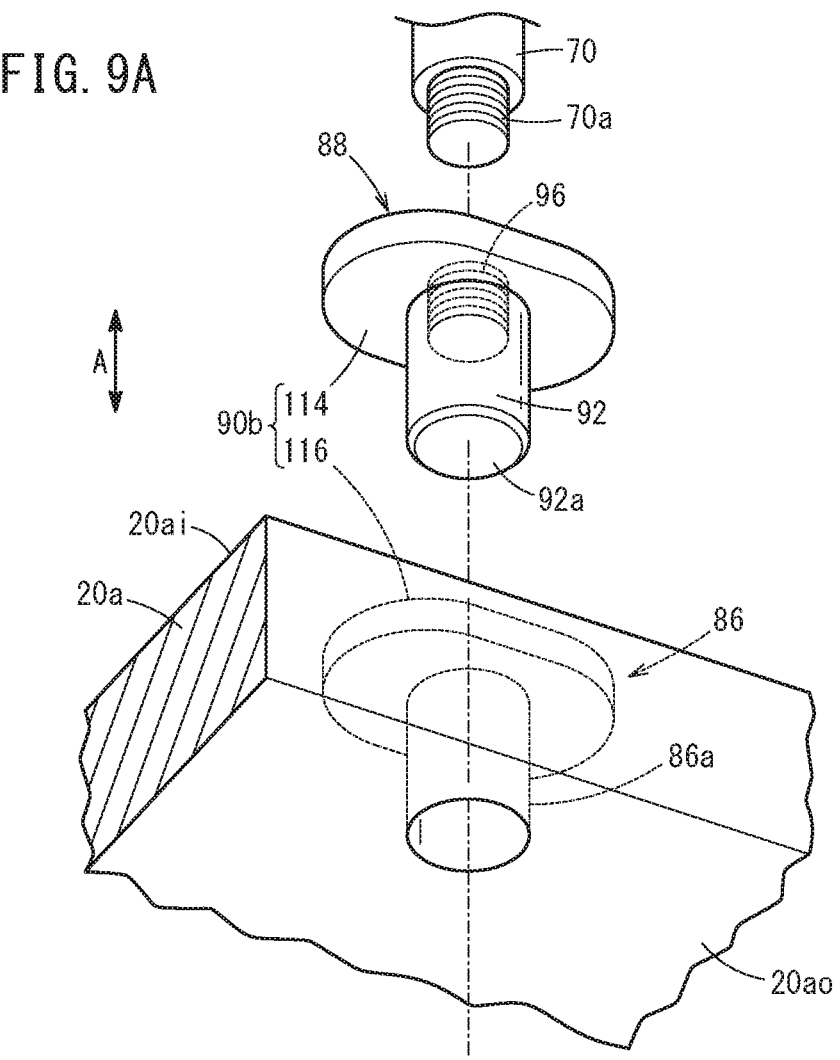
FIG. 9A is an exploded perspective view with partial omission showing a rotation restriction mechanism according to a second modified embodiment.
Figure 9B:
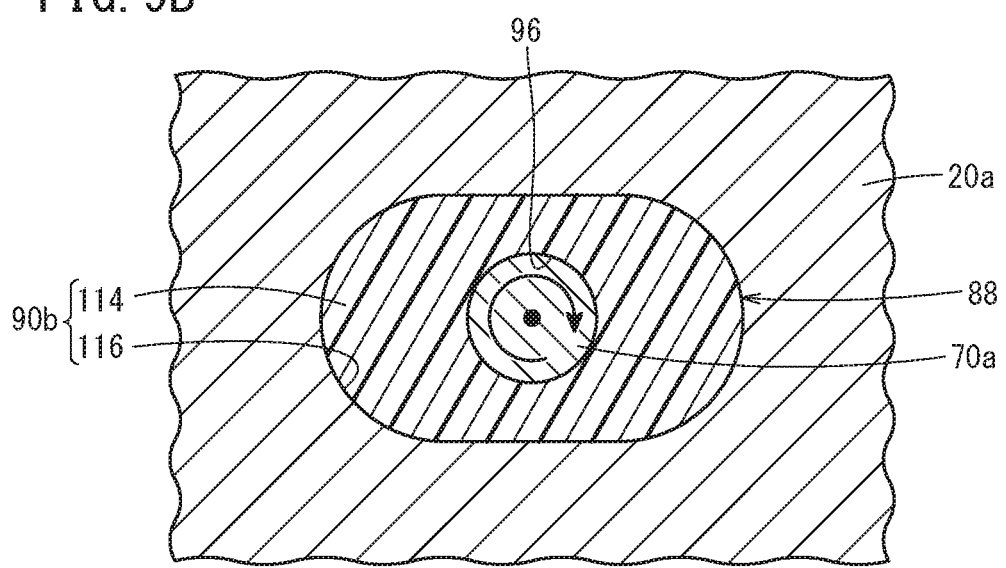
FIG. 9B is a lateral cross sectional view with partial omission showing the rotation restriction mechanism in FIG. 9A.

As shown in FIGS. 9A and 9B, a rotation restriction mechanism 90b according to the second modified embodiment includes a flange part 114 provided to a collar body 92, and a flange hole 116 connected to an insertion hole 86a. The flange part 114 has an oval shape. The flange part 114 forms part of a collar member 88. The flange hole 116 has a shape (oval shape) corresponding to the flange part 114. The flange hole 116 forms part of a through hole 86.

Each of the flange part 114 and the flange hole 116 may not have an oval shape as long as it does not have a circular shape. That is, each of the flange part 114 and the flange hole 116 may have a polygonal shape (e.g., a triangular shape, a quadrangular shape), an ellipse shape, etc.

The rotation restriction mechanism 90b according to this modified embodiment includes the flange part 114 having the non-circular shape and provided to the collar body 92, and the flange hole 116 connected to the insertion hole 86a, the flange part 114 being inserted into the flange hole 116. The flange hole 116 has a shape corresponding to the flange part 114.

In this case, with the simple structure, it is possible to restrict rotation of the collar member 88 relative to the end plate 20a in the screw tightening direction of the positioning pin 70.

Third Modified Embodiment

Figure 10A:
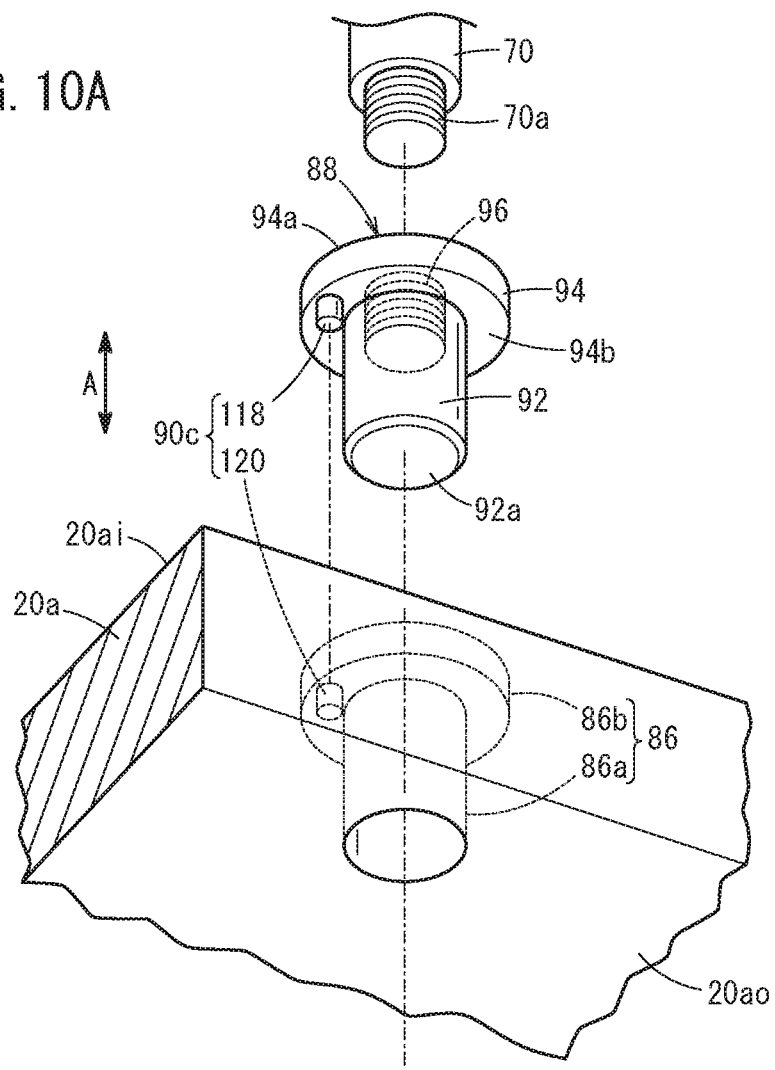
FIG. 10A is an exploded perspective view with partial omission showing a rotation restriction mechanism according to a third modified embodiment.
Figure 10B:
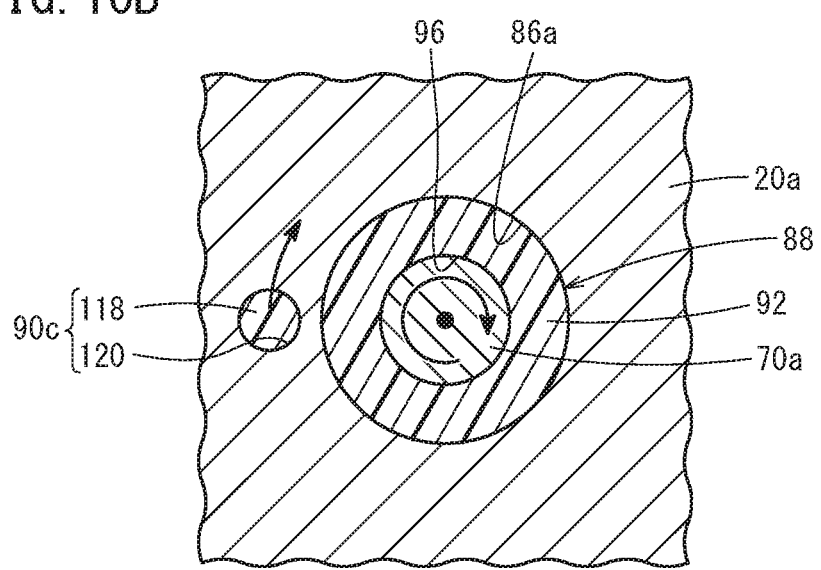
FIG. 10B is a lateral cross sectional view with partial omission showing the rotation restriction mechanism in FIG. 10A.

As shown in FIGS. 10A and 10B, a rotation restriction mechanism 90c according to the third modified embodiment includes one protruding pin 118 protruding from a flange part 94 in an axial direction of a collar body 92, and a hole 120 into which the protruding pin 118 is inserted. The protruding pin 118 is a circular column part protruding from a surface 94b, of the flange part 94, closer to the collar body 92. The protruding pin 118 is spaced from the collar body 92. The hole 120 has a shape corresponding to the shape of the collar body 92.

The protruding pin 118 and the hole 120 may be provided in plurality. The shape, the size, and the position of each of the protruding pin 118 and the hole 120 may be determined arbitrarily. The protruding pin 118 may be formed integrally with the flange part 94. Alternatively, the protruding pin 118 may be joined to the flange part 94.

The rotation restriction mechanism 90c according to this modified embodiment includes the protruding pin 118 protruding from the flange part 94 in the axial direction of the collar body 92, and the hole 120 formed in the end plate 20a to extend in the axial direction of the collar body 92, the protruding pin 118 being inserted into the hole 120.

In this case, with the simple structure, it is possible to restrict rotation of the collar member 88 relative to the end plate 20a in the screw tightening direction of the positioning pin 70.

Fourth Modified Embodiment

Figure 11A:
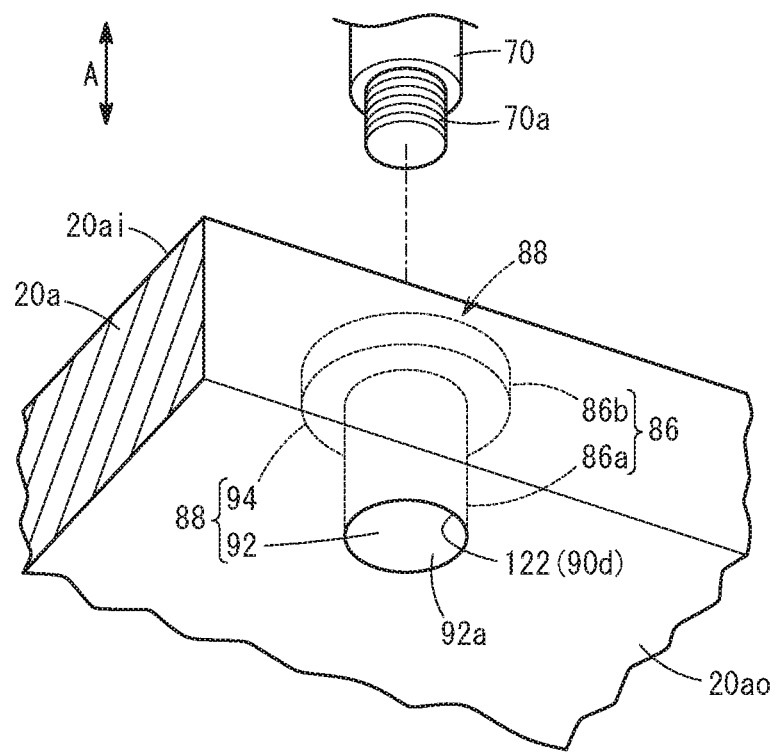
FIG. 11A is an exploded perspective view with partial omission showing a rotation restriction mechanism according to a fourth modified embodiment.
Figure 11B:
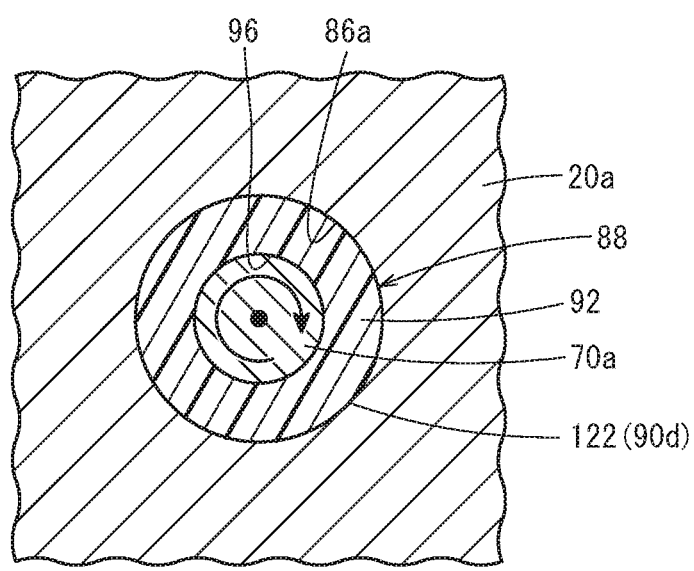
FIG. 11B is a lateral cross sectional view with partial omission showing the rotation restriction mechanism in FIG. 11A.

As shown in FIGS. 11A and 11B, a rotation restriction mechanism 90d according to the fourth modified embodiment includes an integrally molded part 122 in which a collar member 88 and the end plate 20a are formed integrally by injection molding. That is, the collar member 88 and the insertion hole 86a of the end plate 20a are formed integrally by outsert molding.

According to this modified embodiment, with the simple structure, it is possible to restrict rotation of the collar member 88 relative to the end plate 20a in the screw tightening direction of the positioning pin 70.

Fifth Modified Embodiment

Figure 12A:
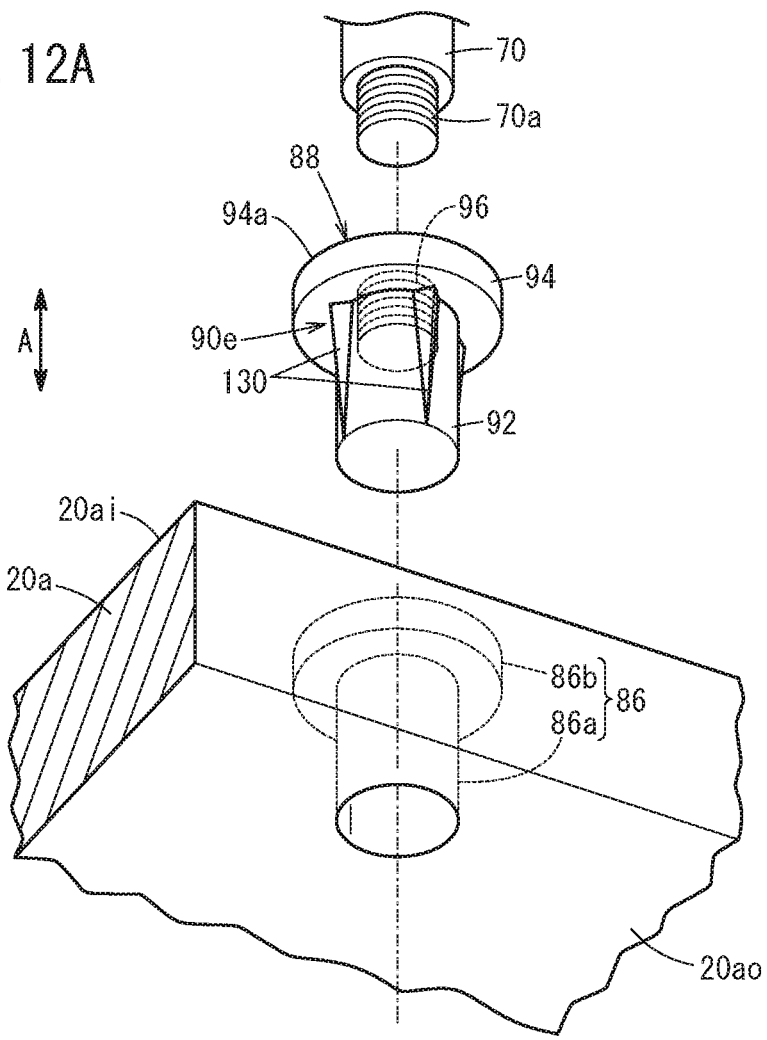
FIG. 12A is an exploded perspective view with partial omission showing a rotation restriction mechanism according to a fifth modified embodiment.
Figure 12B:
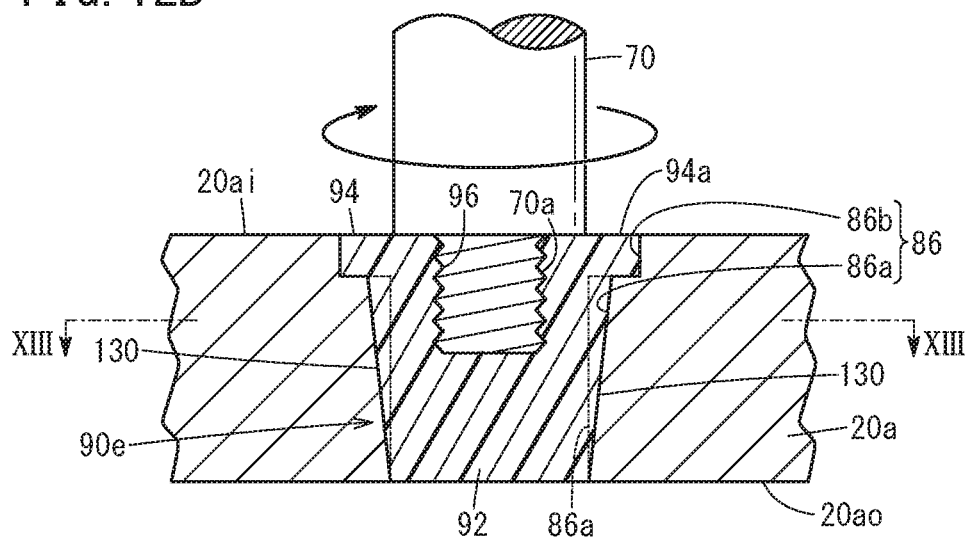
FIG. 12B is a vertical cross sectional view with partial omission showing the rotation restriction mechanism in FIG. 12A.
Figure 13:
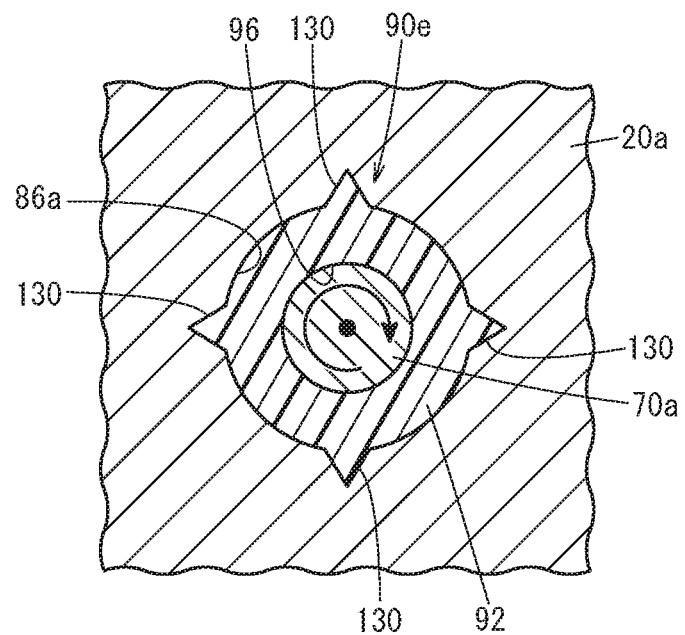
FIG. 13 is a cross sectional view taken along a line XIII-XIII in FIG. 12B.

As shown in FIGS. 12A to 13, a rotation restriction mechanism 90e according to the fifth modified embodiment includes a plurality of (four, in this embodiment) projections 130 protruding outward in the radial direction from the outer circumferential surface of a collar body 92. The projections 130 are arranged at equal intervals in the circumferential direction of the collar body 92. The projections 130 extend over the entire length of the collar body 92 in the axial direction. That is, the projections 130 are coupled to the flange part 94.

Each of the projections 130 has a triangular shape tapered in the protruding direction. Stated otherwise, the projection 130 has a triangular shape in lateral cross section. The protruding length of the projection 130 is gradually decreased in a direction away from the flange part 94.

In this modified embodiment, the collar body 92 is inserted under pressure into the insertion hole 86a. Therefore, the collar body 92 is inserted into the insertion hole 86a while the plurality of projections 130 deforms the wall surface forming the insertion hole 86a (see FIGS. 12B and 13). That is, the projections 130 bite into the wall surface forming the insertion hole 86a.

In this modified embodiment, with the simple structure, it is possible to restrict rotation of the collar member 88 relative to the end plate 20a in the screw tightening direction of the positioning pin 70.

The present invention is not limited to the above structures. The positioning hole 62 may be formed in the membrane electrode assembly (MEA 34) and the separators (the first separator 36a and the second separator 36b).

The present invention is not limited to the above described embodiments. It is a matter of course that various structures can be adopted.

What is claimed is:

1. A fuel cell stack comprising:
   a stack body comprising a plurality of unit cells stacked together;
   an end plate made of metal and provided at each of both ends of the stack body in a stacking direction;
   a positioning pin inserted into a positioning hole provided in each of the plurality of unit cells to position the plurality of unit cells;
   an insulating collar member provided inside the end plate and screwed with the positioning pin; and
   a rotation restriction mechanism configured to restrict rotation of the collar member relative to the end plate in a screw tightening direction of the positioning pin;
   wherein a female screw part is formed in an inner circumference of the collar member, and
   a male screw part is formed at one end of the positioning pin and screwed with the female screw part inside the collar member.

2. The fuel cell stack according to claim 1, wherein the collar member comprises a collar body having a circular column shape or a cylindrical shape and inserted into an insertion hole formed in the end plate, and
   the rotation restriction mechanism comprises:
   a projection protruding outward in a radial direction from an outer circumferential surface of the collar body; and
   a groove extending in an axial direction of the collar body and formed in a wall surface forming the insertion hole, the projection being inserted into the groove.

3. The fuel cell stack according to claim 1, wherein the collar member comprises a collar body having a circular column shape or a cylindrical shape and inserted into an insertion hole formed in the end plate, and
   the rotation restriction mechanism comprises:
   a male screw part formed in an outer circumferential surface of the collar body; and
   a female screw part formed in a wall surface forming the insertion hole and screwed with the male screw part.

4. The fuel cell stack according to claim 1, wherein the collar member comprises a collar body having a circular column shape or a cylindrical shape and inserted into an insertion hole formed in the end plate,
   the rotation restriction mechanism comprises:
   a flange part having a non-circular shape and provided to the collar body; and
   a flange hole connected to the insertion hole, the flange part being inserted into the flange hole, and
   the flange hole has a shape corresponding to the flange part.

5. The fuel cell stack according to claim 1, wherein the collar member comprises:
   a collar body having a circular column shape or a cylindrical shape and inserted into an insertion hole formed in the end plate; and
   a flange part provided to the collar body, and
   the rotation restriction mechanism comprises:
   a protruding pin protruding from the flange part in an axial direction of the collar body; and a hole formed in the end plate to extend in the axial direction of the collar body, the protruding pin being inserted into the hole.

6. The fuel cell stack according to claim 1, wherein the rotation restriction mechanism comprises an integrally molded part in which the collar member and the end plate are formed integrally by injection molding.

7. The fuel cell stack according to claim 1, wherein
the collar member comprises a collar body having a circular column shape or a cylindrical shape and inserted into an insertion hole formed in the end plate,
the rotation restriction mechanism comprises a protrusion protruding outward in a radial direction from an outer circumferential surface of the collar body, and
the protrusion is inserted under pressure into a wall surface forming the insertion hole.

8. The fuel cell stack according to claim 7, wherein
the collar member comprises a flange part provided to the collar body, and
the protrusion is coupled to the flange part.

9. The fuel cell stack according to claim 1, wherein each of the plurality of unit cells comprises:
a membrane electrode assembly including an electrolyte membrane and electrodes provided on both sides of the electrolyte membrane;
separators provided on both sides of the membrane electrode assembly; and
protrusions protruding from an outer peripheral portion of each of the separators, and each having the positioning hole.

10. The fuel cell stack according to claim 9, wherein a wall forming the positioning hole is made of electrically insulating material.

11. A method of assembling a fuel cell stack comprising a stack body comprising a plurality of unit cells stacked together, an end plate made of metal and provided at each of both ends of the stack body in a stacking direction, and a positioning pin inserted into a positioning hole provided in each of the plurality of unit cells to position the plurality of unit cells,
the method comprising the steps of:
screwing the positioning pin with an insulating collar member provided inside the end plate; and
stacking the plurality of unit cells together while inserting the positioning pin into the positioning hole, after the screwing step, wherein
in the screwing step, rotation of the collar member relative to the end plate in a screw tightening direction of the positioning pin is restricted by a rotation restriction mechanism,
wherein a female screw part is formed on an inner circumference of the collar member, and
a male screw part is formed at one end of the positioning pin and screwed with the female screw part inside the collar member.

12. A fuel cell stack comprising:
a stack body comprising a plurality of unit cells stacked together;
an end plate made of metal and provided at each of both ends of the stack body in a stacking direction;
a positioning pin inserted into a positioning hole provided in each of the plurality of unit cells to position the plurality of unit cells;
an insulating collar member provided inside the end plate and screwed with the positioning pin; and
a rotation restriction mechanism configured to restrict rotation of the collar member relative to the end plate in a screw tightening direction of the positioning pin, wherein
the collar member comprises a collar body having a circular column shape or a cylindrical shape and inserted into an insertion hole formed in the end plate,
the rotation restriction mechanism comprises a protrusion protruding outward in a radial direction from an outer circumferential surface of the collar body, and
the protrusion is inserted under pressure into a wall surface forming the insertion hole,
wherein the collar member comprises a flange part provided to the collar body, and the protrusion is directly coupled to the flange part.

* * * * *